United States Patent
Chiao et al.

(10) Patent No.: US 9,020,292 B2
(45) Date of Patent: Apr. 28, 2015

(54) METHOD FOR CORRECTING ROLLING SHUTTER EFFECT AND IMAGE PROCESSING DEVICE USING THE SAME

(71) Applicants: Yen-Hao Chiao, Kaohsiung (TW); Shang-Hong Lai, Hsinchu (TW); Ming-Feng Chiang, Miaoli County (TW)

(72) Inventors: Yen-Hao Chiao, Kaohsiung (TW); Shang-Hong Lai, Hsinchu (TW); Ming-Feng Chiang, Miaoli County (TW)

(73) Assignees: Novatek Microelectronics Corp., Hsinchu (TW); National Tsing Hua University, Hsinchu (TW)

( * ) Notice: Subject to any disclaimer, the term of this patent is extended or adjusted under 35 U.S.C. 154(b) by 108 days.

(21) Appl. No.: 13/957,442

(22) Filed: Aug. 2, 2013

(65) Prior Publication Data

US 2014/0153840 A1 Jun. 5, 2014

(30) Foreign Application Priority Data

Dec. 5, 2012 (CN) .......................... 2012 1 0514616

(51) Int. Cl.
| | | |
|---|---|---|
| G06K 9/40 | (2006.01) | |
| G06T 5/00 | (2006.01) | |
| G06T 7/20 | (2006.01) | |
| H04N 5/235 | (2006.01) | |
| H04N 5/353 | (2011.01) | |

(52) U.S. Cl.
CPC ................. *G06T 5/003* (2013.01); *G06T 5/006* (2013.01); *G06T 7/204* (2013.01); *H04N 5/235* (2013.01); *H04N 5/3532* (2013.01)

(58) Field of Classification Search
None
See application file for complete search history.

(56) References Cited

U.S. PATENT DOCUMENTS

| 8,493,454 B1 * | 7/2013 | Kohn et al. ................ 348/208.6 |
|---|---|---|
| 2012/0092559 A1 * | 4/2012 | Ubillos ......................... 348/607 |
| 2013/0088610 A1 * | 4/2013 | Lee et al. ................. 348/208.99 |
| 2014/0049658 A1 * | 2/2014 | Yamazaki ............... 348/208.11 |
| 2014/0078327 A1 * | 3/2014 | Miyasako ................. 348/208.6 |

OTHER PUBLICATIONS

Liang et al., "Analysis and Compensation of Rolling Shutter Effect," Image Processing, IEEE Transactions on, Aug. 2008, pp. 1323-1330, vol. 17, No. 8.

Baker et al., "Removing Rolling Shutter Wobble," Proceedings of the IEEE Conference on Computer Vision and Pattern Recognition, Jun. 2010, pp. 1-8.

(Continued)

*Primary Examiner* — Li Liu
(74) *Attorney, Agent, or Firm* — Jianq Chyun IP Office

(57) ABSTRACT

A method for correcting a rolling shutter effect is provided. The method includes: obtaining feature point pairs in images, wherein each of the feature point pairs corresponds to a motion vector; obtaining sampling points between two consecutive images in time; setting a moving velocity and an angular velocity of an image capturing unit at each of the sampling points as variables; obtaining estimating motion vectors according to the variables, a focal length of the image capturing unit, and row locations where the feature point pairs are located; executing an optimization algorithm according to a difference between the motion vectors and the estimating motion vectors, to calculate the moving velocity and the angular velocity corresponding to the variables; varying locations of pixels in an image according to the moving velocity and the angular velocity, to generate a first corrected image. Thereby, the rolling shutter effect in an image is removed.

16 Claims, 7 Drawing Sheets

(56) References Cited

OTHER PUBLICATIONS

Forssen et al., "Rectifying rolling shutter video from hand-held devices," Computer Vision and Pattern Recognition (CVPR), 2010 IEEE Conference on, Jun. 13-18, 2010, pp. 507-514.

Karpenko et al., "Digital Video Stabilization and Rolling Shutter Correction using Gyroscopes," Stanford University Computer Science Tech Report CSTR, Mar. 2011, pp. 1-7.

Liu et al., "Subspace Video Stabilization," ACM Transactions on Graphics, Jan. 2011, pp. 4:1-4:10.

Grundmann et al., "Calibration-Free Rolling Shutter Removal," in Proceedings of IEEE Conference on Computational Photography, 2012, pp. 1-8.

Papadimitriou et al., "Robust Estimation of Rigid-Body 3-D Motion Parameters Based on Point," IEEE Transactions on Circuits and Systems for Video Technology, Jun. 2000, pp. 541-549, vol. 10, No. 4.

Chiao et al., "Rolling Shutter Video Correction and Stabilization," Thesis of Master degree, National Tsinghua University, 2012, pp. 900-904.

Yen-Hao Chiao, "Rolling Shutter Video Correction and Stabilization," Master Thesis, Department of Computer Science, National Tsing Hua University, Aug. 18, 2012.

"Office Action of Taiwan Counterpart Application," issued on Feb. 16, 2015, p. 1-10.

* cited by examiner

METHOD FOR CORRECTING ROLLING SHUTTER EFFECT AND IMAGE PROCESSING DEVICE USING THE SAME

CROSS-REFERENCE TO RELATED APPLICATION

This application claims the priority benefit of china application serial no. 201210514616.1, filed on Dec. 5, 2012. The entirety of the above-mentioned patent application is hereby incorporated by reference herein and made a part of this specification.

TECHNICAL FIELD

The invention relates to a method for correcting a rolling shutter effect and an image processing device using the same.

BACKGROUND

Generally speaking, a photosensitive element of a camera can be implemented by a complementary metal-oxide semiconductor (CMOS) or a charge coupled device (CCD). Nevertheless, when the complementary metal-oxide semiconductor is applied, only a row of photosensitive elements are exposed at each time point. Therefore, when a camera or an object to be captured moves during image capturing, a so-called rolling shutter effect is generated.

FIG. 1 is a schematic diagram illustrating a rolling shutter effect.

As shown in FIG. 1, a camera 110 is applied to capture an object 120. Ideally, in the captured image, the object 120 should be in an upright position (such as an object 130). Here, it is assumed that a time for the camera 110 to capture an image is S. During the process of capturing the object 120, the location of the camera 110 at a time point nS is not the same as the location of the camera 110 at a time point (n+1)S. As such, in the captured image 140, the object 150 is actually in a tilted position. This is because the camera 110l captures the upper half of the object 120 at the time point nS, and while the camera 110 is going to capture the bottom half of the object 120, the location of the camera 110 has already been changed. In other words, if the object to be captured moves rapidly, there will be one horizontal translation for the pixel values obtained by the photosensitive element on each row. Thus, how to correct the rolling shutter effect generated during image capturing has become one of the concern topics to people having ordinary skill in the pertinent field.

SUMMARY

Embodiments of the invention are directed to a method for correcting a rolling shutter effect and an image processing device using the same, in which the rolling shutter effect generated during image capturing is corrected.

One embodiment of the invention provides a method for correcting a rolling shutter effect that is adapted for an image processing device. The method includes: obtaining a plurality of feature point pairs in a plurality of images of a video, wherein each of the feature point pairs corresponds to a motion vector, and the video is captured by an image capturing unit; obtaining a plurality of sampling points between two consecutive images in time, wherein each of the sampling points corresponds to a row location; setting at least one moving velocity and at least one angular velocity of the image capturing unit at each of the sampling points as a plurality of variables; obtaining a plurality of estimating motion vectors of the feature point pairs according to the variables, a focal length of the image capturing unit and the row locations where the feature point pairs are located; executing an optimization algorithm according to a difference between the motion vectors and the estimating motion vectors, so as to calculate the moving velocity and the angular velocity corresponding to the variables; and varying locations of a plurality of pixels in an image according to the moving velocity and the angular velocity, so as to generate a first corrected image.

According to an embodiment of the invention, the feature point pairs include a second feature point pair. The second feature point pair includes a second feature point and a third feature point. The location of the second feature point is $(x_1, y_1)$, and the location of the third feature point is $(x_2, y_2)$. The motion vector corresponding to the second feature point pair is $(x_2-x_1, y_2-y_1)$, wherein the step of obtaining the estimating motion vectors of the feature point pairs according to the variables, the focal length of the image capturing unit and the row locations where the feature point pairs are located includes: calculating an x-component of the estimating motion vector corresponding to the second feature point pair according to the following Equation (1), and calculating a y-component of the estimating motion vector corresponding to the second feature point pair according to the following Equation (2):

$$\sum_{i=S1}^{S2} \frac{f}{Z}\overline{v_x}(i) + \frac{x_1 y_1}{f}\overline{w_x}(i) - \left(f + \frac{x_1^2}{f}\right)\overline{w_y}(i) + y_1\overline{w_z}(i) \quad (1)$$

$$\sum_{i=S1}^{S2} \frac{f}{Z}\overline{v_y}(i) + \frac{x_1 y_1}{f}\overline{w_y}(i) - \left(f + \frac{y_1^2}{f}\right)\overline{w_x}(i) + x_1\overline{w_z}(i) \quad (2)$$

wherein S1 and S2 are real numbers, S1 represents the sampling point corresponding to the row location where the second feature point is located, and S2 represents the sampling point corresponding to the row location where the third feature point is located, f is a focal length of the image capturing unit, Z is a depth of field of the images, $\overline{v_x}(i)$ is a moving velocity of the image capturing unit at a sampling point i in an x-direction, $\overline{v_y}(i)$ is a moving velocity of the image capturing unit at the sampling point i in a y-direction, $\overline{w_x}(i)$ is an angular velocity of the image capturing unit at the sampling point i on an x-axis, $\overline{w_y}(i)$ is an angular velocity of the image capturing unit at the sampling point i on a y-axis, and $\overline{w_z}(i)$ is an angular velocity of the image capturing unit at the sampling point i on a z-axis.

According to an embodiment of the invention, the step of executing the optimization algorithm according to the difference between the motion vectors and the estimating motion vectors includes: generating a plurality of constraints according to x-components and y-components of the motion vectors; generating a first matrix according to the estimating motion vectors, wherein the number of rows in the first matrix is greater than the number of columns in the first matrix; generating a cost function according to a result obtained by subtracting the constraints from the product of the first matrix and the variables, and executing the optimization algorithm according to the cost function so as to obtain the moving velocity and the angular velocity corresponding to the variables.

According to an embodiment of the invention, the cost function further includes a result obtained from the product of the variables and a differential matrix. A value of a $j^{th}$ column and a $j^{th}$ row in the differential matrix is −1, and a value of the $j^{th}$ row and a $j+1^{th}$ column in the differential matrix is 1, in which j is a positive integer.

According to an embodiment of the invention, the product of a second matrix and a third matrix is the first matrix. In an $i^{th}$ row of the second matrix, only values from a $5(i-1)+1^{th}$ column to a $5i^{th}$ column are not equal to zero, and an $i^{th}$ column of the second matrix corresponds to an $i^{th}$ constraint of the constraints, in which i is a positive integer. The $i^{th}$ constraint corresponds to a $(5(i-1)+1)^{th}$ row to a $5i^{th}$ row of the third matrix, and values of a sampling interval without corresponding to the $i^{th}$ constraint in the $(5(i-1)+1)^{th}$ row to the $5i^{th}$ row are equal to zero.

According to an embodiment of the invention, the images include a second image. A location of a first pixel in the second image is ($x_{rs}$, $y_{rs}$). The step of varying the locations of the pixels in an image according to the moving velocity and the angular velocity corresponding to the variables so as to generate the first corrected image includes: calculating a translation $p_x$ of the first pixel in an x-direction according to Equation (3), and calculating a translation $p_y$ of the first pixel in a y-direction according to Equation (4), in which $p_x$ and $p_y$ are real numbers.

$$p_x = \int_{(n+ay_{rs})S}^{(n+0.5)S} \frac{f}{Z}v_x(t) + \frac{1}{f}x_{rs}y_{rs}w_x(t) - \left(f + \frac{x_{rs}^2}{f}\right)w_y(t) + y_{rs}w_z(t)dt \quad (3)$$

$$p_y = \int_{(n+ay_{rs})S}^{(n+0.5)S} \frac{f}{Z}v_y(t) - \frac{1}{f}x_{rs}y_{rs}w_y(t) + \left(f + \frac{y_{rs}^2}{f}\right)w_x(t) - x_{rs}w_z(t)dt \quad (4)$$

wherein n and S are positive integers, the second image begins to expose from a time point nS to a time point (n+1)S, a is a floating point number, $v_x(t)$ is the moving velocity of the image capturing unit at a time point t in the x-direction, $v_y(t)$ is the moving velocity of the image capturing unit at the time point t in the y-direction, $w_x(t)$ is the angular velocity of the image capturing unit at the time point t on an x-axis, $w_y(t)$ is the angular velocity of the image capturing unit at the time point t on a y-axis, and $w_z(t)$ is the angular velocity of the image capturing unit at the time point t on a z-axis.

According to an embodiment of the invention, the method for correcting the rolling shutter effect further includes: generating a capturing trajectory according to the moving velocity and the angular velocity; executing a filter calculation for the capturing trajectory; setting a smooth capturing trajectory as a second variable, and generating a cost function according to a second difference between the second variable and the capturing trajectory after executing the filter calculation; and executing a second optimization algorithm according to the cost function, so as to obtain the smooth capturing trajectory.

According to an embodiment of the invention, the method for correcting the rolling shutter effect further includes: varying the locations of the pixels in the first corrected image according to a difference between the smooth capturing trajectory and the capturing trajectory, so as to generate a second corrected image.

From another perspective, the invention provides an image processing device, which includes a memory and a processor. There are a plurality of instructions stored in the memory. The processor is coupled to the memory, and executes the instructions to execute a plurality of steps: obtaining a plurality of feature point pairs in a plurality of images of a video, wherein each of the feature point pairs corresponds to a motion vector, and the video is captured by an image capturing unit; obtaining a plurality of sampling points between two consecutive images in time, wherein each of the sampling points corresponds to a row location; setting at least one moving velocity and at least one angular velocity of the image capturing unit at each of the sampling points as a plurality of variables; obtaining a plurality of estimating motion vectors of the feature point pairs according to the variables, a focal length of the image capturing unit and the row locations where the feature point pairs are located; executing an optimization algorithm according to a difference between the motion vectors and the estimating motion vectors, so as to calculate the moving velocity and the angular velocity corresponding to the variables; and varying locations of a plurality of pixels in an image according to the moving velocity and the angular velocity, so as to generate a first corrected image.

Based on the above, in the embodiments of the invention, the method for correcting the rolling shutter effect and the image processing device using the same are capable of applying the optimization algorithm to obtain the moving velocity and the angular velocity of the image capturing unit, thereby varying the locations of the pixels in an image. By this way, the rolling shutter effect in the images can be corrected.

Several exemplary embodiments accompanied with figures are described in detail below to further describe the disclosure in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
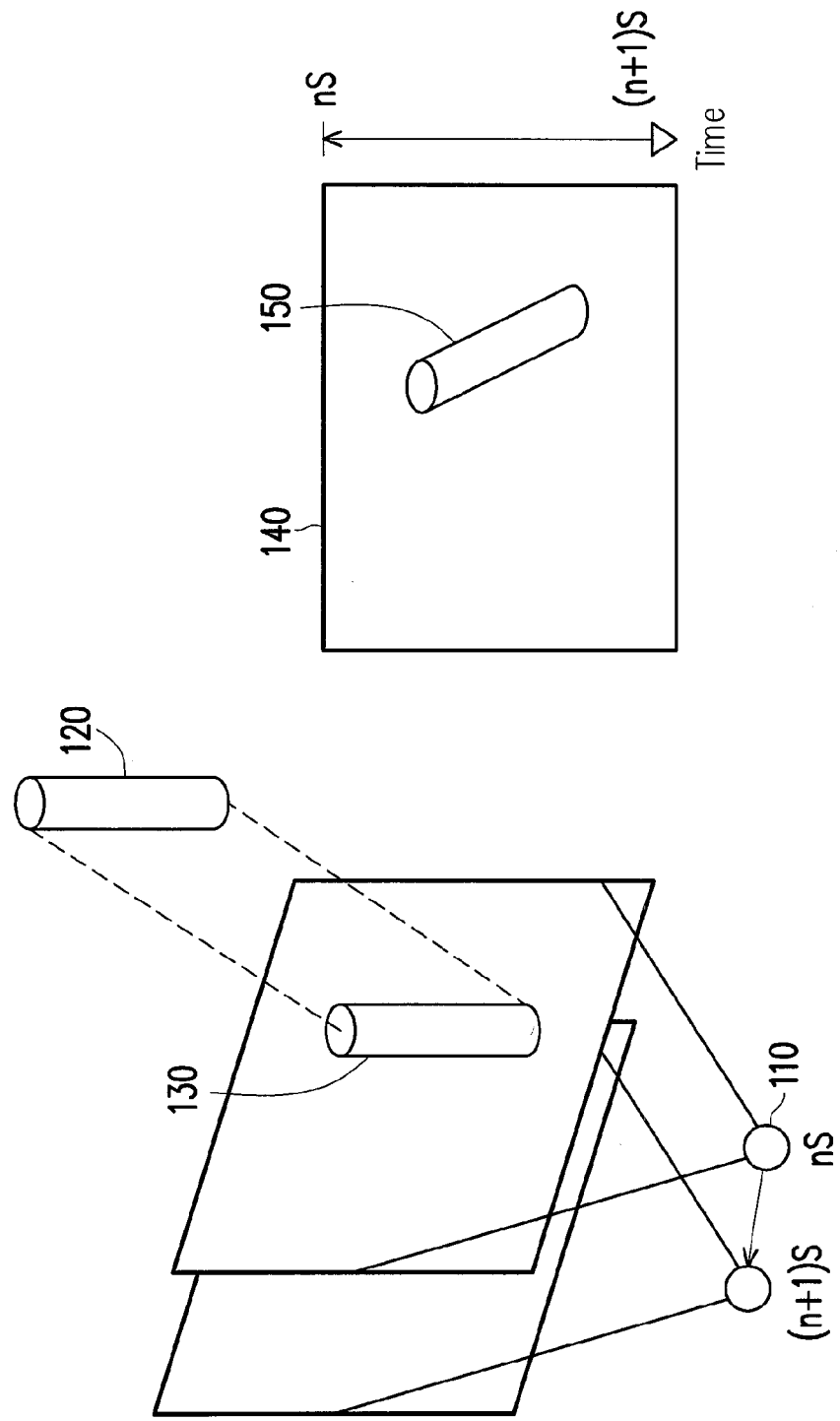
FIG. 1 is a schematic diagram illustrating a rolling shutter effect.
Figure 2:
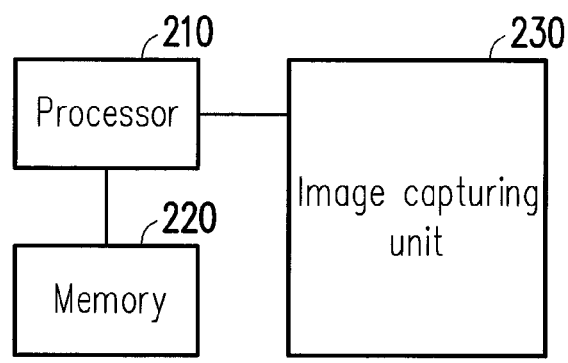
FIG. 2 is a schematic diagram illustrating an image processing device according to an embodiment of the invention.

FIG. 2 is a schematic diagram illustrating an image processing device according to an embodiment of the invention.

Referring to FIG. 2, the image processing device 200 includes a processor 210, a memory 220 and an image capturing unit 230. In the embodiment, the image processing device 200 is a video camera. However, in other embodiments, the image capturing device 200 can also be a personal computer, a smart phone, a tablet computer, a notebook computer, a server or a camera.

The processor 210 controls the overall operation of the image processing device 200. For instance, the processor 210 can be a central processing unit (CPU), a microprocessor, a digital signal processor (DSP), a programmable controller, an application specific integrated circuits (ASIC) or a programmable logic device (PLD).

The memory 220 can be a dynamic random access memory (DRAM), a static random access memory (SRAM), a flash memory or other memories. In the embodiment, there are a plurality of instructions stored in the memory 220.

The image capturing unit 230 is configured to obtain a video, and the video includes a plurality of images. For instance, the image capturing unit 230 includes a complementary metal oxide semiconductor, a shutter and a lens. The image capturing unit 230 transmits the images to the processor 210, and the processor 210 executes the instructions in the memory 220 so as to remove the rolling shutter effect in the images.

Figure 3:
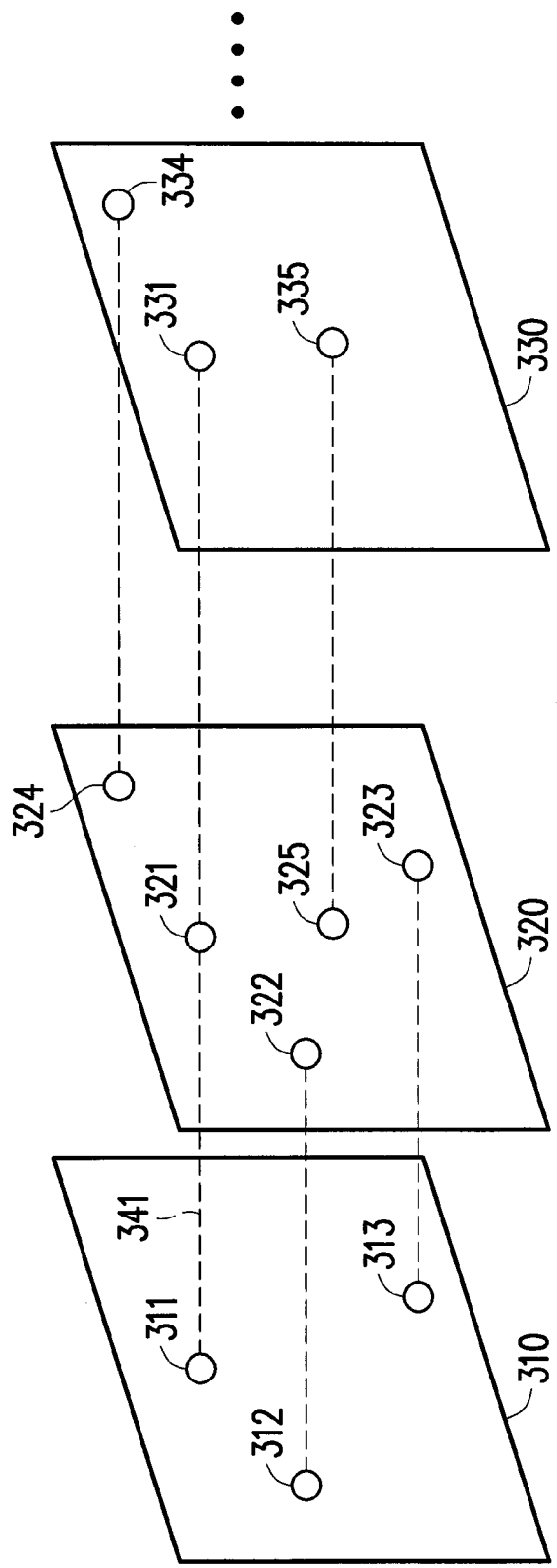
FIG. 3 is a schematic diagram illustrating the way to obtain feature point pairs according to an embodiment of the invention.

FIG. 3 is a schematic diagram illustrating the way to obtain feature point pairs according to an embodiment of the invention.

Referring to FIG. 3, the video obtained by the image capturing unit 230 includes images 310, 320 and 330. The processor 210 obtains a plurality of feature point pairs in the images 310, 320 and 330. For instance, the processor 210 can execute the scale-invariant feature transform (SIFT) to obtain a plurality of feature points and feature values corresponding to each of the feature points. The processor 210 compares these feature values to acquire the feature points that are matched with each other in various images. For instance, the image 310 includes the feature points 311~313, the image 320 includes the feature points 321~325, and the image 330 includes the feature points 331, 334 and 335, in which the feature point 311 is matched with the feature point 321, the feature point 312 is matched with the feature point 322, and the feature point 313 is matched with the feature point 323. The feature points corresponding to each other can form a feature point pair, for instance, the feature points 311 and 321 can form a feature point pair 341. Each of the feature point pairs corresponds to a motion vector, and the two feature points corresponding to one of the feature point pairs represent the two locations of an object. For instance, an object is moved from a location of the feature point 311 to a location of the feature point 321.

In the present embodiment, the processor 210 can obtain two hundreds feature point pairs between every two consecutive images in time. However, in other embodiments, the processor 210 can also obtain a number of feature point pairs, more or less than two hundreds, although the invention is not limited thereto. Additionally, the processor 210 can also utilize an optical flow method or a motion estimation method to obtain the feature point pairs, although the invention is not limited thereto.

Figure 4:
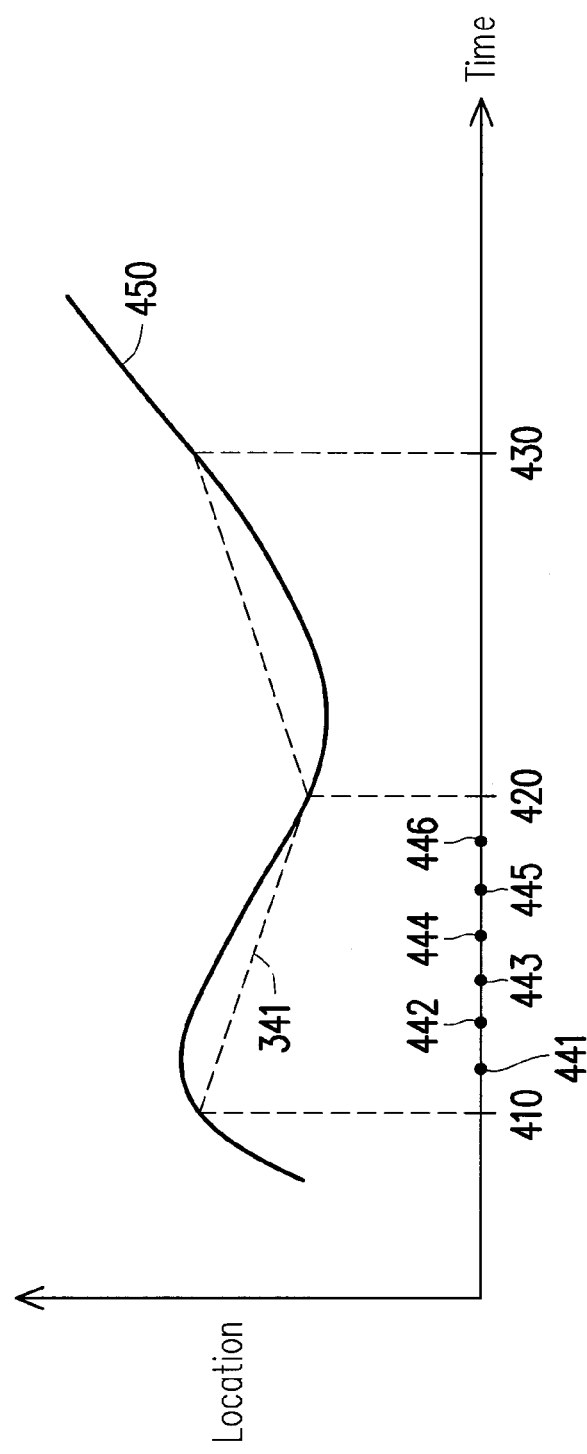
FIG. 4 is a schematic diagram illustrating the way to obtain sampling points between two consecutive images according to an embodiment of the invention.

FIG. 4 is a schematic diagram illustrating the way to obtain sampling points between two consecutive images according to an embodiment of the invention.

In FIG. 3, the motion vector corresponding to the feature point pair 341 is between two consecutive images. However, when a motion vector caused by the rolling shutter effect is calculated, such motion vector requires higher temporal resolution. Referring to FIG. 3 and FIG. 4, the image 310 is captured at a time point 410, the image 320 is captured at a time point 420, and the image 330 is captured at a time point 430. The curve 450 indicates a true translation of an object. However, the motion vector indicated the feature point pair 341 is the result of the curve 450 being "quantized". In the present embodiment, the processor 210 can obtain a plurality of sampling points between two consecutive images in time, and each of the sampling points corresponds to a row location. For instance, a period between the time point 410 and the time point 420 is divided into a plurality of sampling points 441~446 and each of the sampling points 441~446 corresponds to a row location in the image 320. For example, if there are five hundreds and sixty row locations in total in an image, the sampling point 441 corresponds to the $80^{th}$ row location, namely, the image capturing unit 230 exposes the $80^{th}$ row location on the photosensitive element at the sampling point 441. The processor 210 can calculate the moving velocity and the angular velocity of the image capturing unit 230 at each of the sampling points 441~446.

Figure 5:
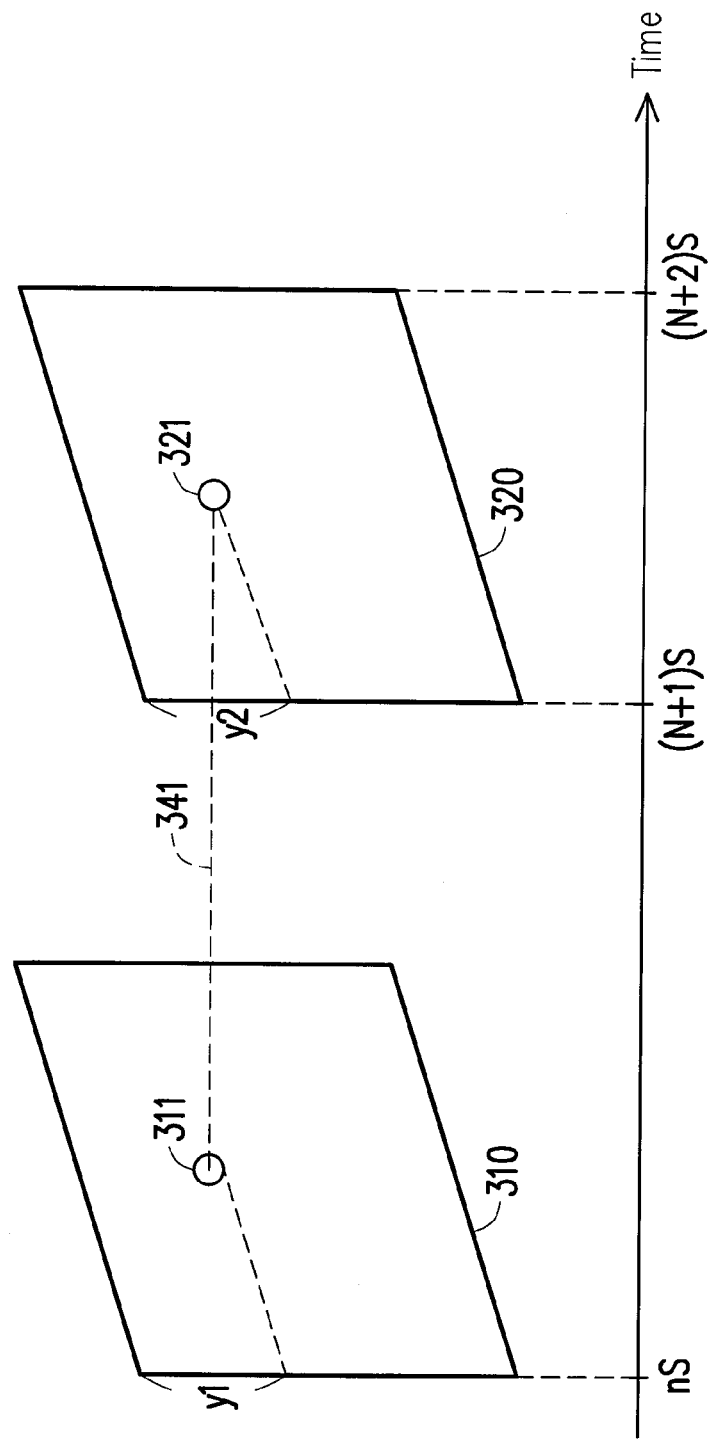
FIG. 5 is a schematic diagram illustrating the way to calculate an estimating motion vector according to an embodiment of the invention.

FIG. 5 is a schematic diagram illustrating the way to calculate an estimating motion vector according to an embodiment of the invention.

Referring to FIG. 5, it is assumed that the image 310 exposes from the time point nS to the time point (n+1)S, and the image 320 exposes from the time point (n+1)S to the time point (n+2)S, in which n is a positive integer, S indicates the required time for exposing an image. The location of the feature point 311 is $(x_1, y_1)$ in the image 310, and the location of the feature point 321 is $(x_2, y_2)$ in the image 320. By this way, the exposure time of the feature point 311 is represented by $(n+ay_1)S$, and the exposure time of the feature point 321 is represented by $(n+1+ay_2)S$, in which a is a floating number and the value thereof is 1/img_rows. img_rows is a positive number, which indicates the number of rows in an image. On the other hand, at the time point t, the moving velocity of the image capturing unit 230 in the x-direction is represented by $v_x(t)$, and the moving velocity of the image capturing unit 230 in the y-direction is represented by $v_y(t)$. Furthermore, for the image capturing unit 230 at the time point t, its angular velocity on the x-axis is represented by $w_x(t)$; its angular velocity on the y-axis is represented by $w_y(t)$; and its angular velocity on the z-axis is represented by $w_z(t)$. The motion vector between the feature point 311 and the feature point 321 is represented by $(x_2-x_1, y_2-y_1)$, which can be calculated by the following Equation (1) and Equation (2).

$$x_2 - x_1 = \int_{(n+ay_1)S}^{(n+1+ay_2)S} \frac{f}{Z}v_x(t) + \frac{1}{f}x_1y_1w_x(t) - \left(f + \frac{x_1^2}{f}\right)w_y(t) + y_1w_z(t)dt \quad (1)$$

$$y_2 - y_1 = \int_{(n+ay_1)S}^{(n+1+ay_2)S} \frac{f}{Z}v_y(t) - \frac{1}{f}x_1y_1w_y(t) + \left(f + \frac{y_1^2}{f}\right)w_x(t) - x_1w_z(t)dt \quad (2)$$

f represents a focal length of the image capturing unit 230, and Z is a depth of field of the images in the video (here, it is assumed to be a constant). The afore-described Equations (1) and (2) are calculated by integration. However, since the period between the image 310 and the image 320 are already divided into the sampling points, the motion vector can be calculated in a discrete manner. When the calculation is performed in the discrete manner, the time point $(n+ay_1)S$ is represented by the sampling point S1 which corresponds to the row location $y_1$ of the feature point 311, and the time point $(n+1+ay_2)S$ is represented by the sampling point S2 which corresponds to the row location $y_2$ of the feature point 321. Thereby, Equations (1) and (2) are re-written as Equations (3) and (4).

$$x_2 - x_1 = \sum_{i=S1}^{S2} \frac{f}{Z}\overline{v_x}(i) + \frac{x_1y_1}{f}\overline{w_x}(i) - \left(f + \frac{x_1^2}{f}\right)\overline{w_y}(i) + y_1\overline{w_z}(i) \quad (3)$$

$$y_2 - y_1 = \sum_{i=S1}^{S2} \frac{f}{Z}\overline{v_y}(i) + \frac{x_1 y_1}{f}\overline{w_y}(i) - \left(f + \frac{y_1^2}{f}\right)\overline{w_x}(i) + x_1\overline{w_z}(i) \qquad (4)$$

$\overline{v_x}(i)$ represents the moving velocity of the image capturing unit 230 at the sampling point i in the x-direction. $\overline{v_y}(i)$ represents the moving velocity of the image capturing unit 230 at the sampling point i in the y-direction. $\overline{w_x}(i)$ represents the angular velocity of the image capturing unit 230 at the sampling point i on the x-axis. $\overline{w_y}(i)$ represents the angular velocity of the image capturing unit 230 at the sampling point i on the y-axis. $\overline{w_z}(i)$ represents the angular velocity of the image capturing unit 230 at the sampling point i on the z-axis.

The processor 210 sets the moving velocities and the angular velocities of the image capturing unit 230 at each of the sampling points as a plurality of variables. According to the variables, the focal length of the image capturing unit 230, and the row locations where the feature point pairs are located, the processor 210 can obtain a plurality of estimating motion vectors of the feature point pairs. For example, two moving velocities and three angular velocities of the image capturing unit 230 at each of the sampling points are represented by five variables. The left-hand sides of Equations (3) and (4) are known conditions that are obtained from the locations of the feature points 311 and 321. The right-hand sides of Equations (3) and (4) are constituted of the plurality of variables, the focal length f, and the sampling points S1 and S2 corresponding to the row locations; here, the calculated motion vectors are also called estimating motion vectors. Theoretically, the motion vectors calculated from the left-hand sides of the equations shall be the same as the estimating motion vectors calculated from the right-hand sides of the equations. Therefore, the processor 210 can execute an optimization algorithm according to a difference between the motion vectors and the estimating motion vectors, so as to calculate the moving velocity and the angular velocity corresponding to the variables.

For example, the five variables at each of the sampling points can be represented by $[\overline{v_x}, \overline{v_y}, \overline{w_x}, \overline{w_y}, \overline{w_z}]^T$. If n sampling points are obtained between two consecutive images, there will be 5n variables between the two images. Additionally, if the moving velocities and the angular velocities are calculated at once between k images, the number of the variables will be 5kn, in which 5kn is set to equal to 5N, and k, n, N are positive integers. These variables can be represented by a vector x which has a dimension of 5N-by-1.

In an embodiment, the processor 210 can only use the moving velocity in the x-direction and the angular velocity on one of the axes. In the invention, the afore-described variables are not limited to include specific moving velocities or angular velocities.

On the other hand, the processor 210 generates a plurality of constraints according to the x-components and the y-components of the motion vectors, and the number of the constraints is greater than the number of the variables (i.e., 5N). In the present embodiment, if m feature point pairs (i.e., m motion vectors) are obtained between the two images, 2m constraints (in correspondence with the x-components and the y-components) are obtained. Moreover, if k images are obtained at once, there will be 2mk constraints, in which 2mk is set to equal to M, and M>5N, where m, M are positive integers. These constraints can be represented by a vector b which has a dimension of M-by-1.

The processor 210 generates a matrix A (or can also be referred as a first matrix) according to the afore-described process of calculating the estimating motion vectors. The number of rows in the matrix A is greater than the number of columns in the matrix A. The processor 210 generates a cost function according to a result obtained by subtracting the constraints b from the product of the matrix A and the variables x, and executes an optimization algorithm according to the cost function so as to obtain the moving velocity and the angular velocity.

For example, the result of multiplying the matrix A and the variables x are the x-components and the y-components of the estimating motion vectors. In the optimization algorithm, the cost function can be represented by the following Equation (5), in which the matrix A has a dimension of M-by-5N.

$$\min_{x}\|Ax - b\| \qquad (5)$$

The matrix A is divided into two matrixes, represented by $A=A_D A_I$, in which the matrix $A_D$ (or can also be referred as a second matrix) is represented by Equation (6) which has a dimension of M-by-5M.

$$A_D = \begin{pmatrix} \overline{coeff(1)} & & \\ & \overline{coeff(2)} & \\ & & \ddots \end{pmatrix} \qquad (6)$$

$\overline{coeff(i)}$ is a vector which has a dimension of 1-by-5, and represents the coefficients corresponding to the $i^{th}$ constraint in Equation (3) or Equation (4). Specifically, the $i^{th}$ constraint corresponds to two feature points, in which the location of one of the feature points is $(x_1^i, y_1^i)$. By this way, as to the constraints of the x-components, $\overline{coeff(i)}$ can be represented by Equation (7), and as to the constraints of the y-components, $\overline{coeff(i)}$ can be represented by Equation (8).

$$\left[\frac{f}{Z}, 0, \frac{1}{f}x_1^i y_1^i, -\left(f + \frac{x_1^{i2}}{f}\right), y_1^i\right] \qquad (7)$$

$$\left[0, \frac{f}{z}, \left(f + \frac{x_1^{i2}}{f}\right), -\frac{1}{f}x_1^i y_1^i, x_1^i\right] \qquad (8)$$

It should be noted that, the five coefficients in Equation (7) correspond to the coefficients in the right-hand side of Equation (3); and the five coefficients in Equation (8) correspond to the coefficients in the right-hand side of Equation (4). In other words, the $i^{th}$ row of the matrix $A_D$ corresponds to the $i^{th}$ constraint of the constraints. In the $i^{th}$ row of the matrix $A_D$, only the values from the $5(i-1)+1^{th}$ column to the $5i^{th}$ column are not equal to zero, but the rest of the columns are equal to zero. The five values not equal to zero are the coefficients (such as, in Equation (7) or Equation (8)) corresponding to the $i^{th}$ constraint.

Figure 6:
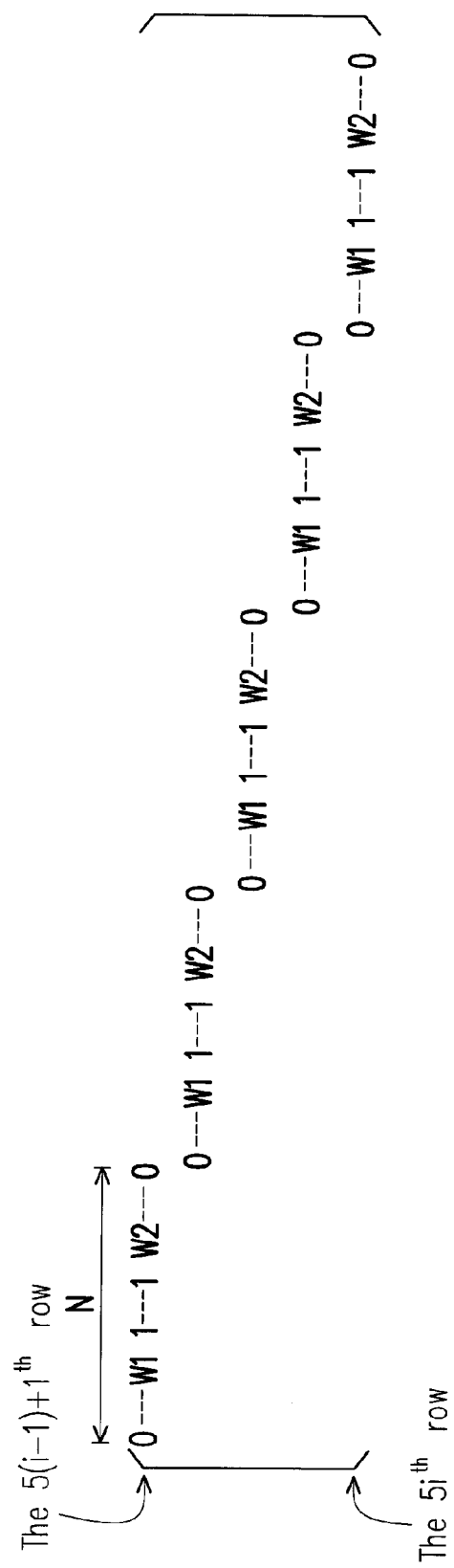
FIG. 6 is a schematic diagram illustrating a portion of a third matrix according to an embodiment of the invention.

On the other hand, the matrix $A_I$ has a dimension of 5M-by-5N, and the $i^{th}$ constraint corresponds to the $(5(i-1)+1)^{th}$ row to the $5i^{th}$ row of the matrix $A_I$. The product of the rows corresponding to the $i^{th}$ constraint and the variables x becomes a vector which has a dimension of 5-by-1 (as shown in FIG. 6). Moreover, the values of a sampling interval without corresponding to the $i^{th}$ constraint in the $(5(i-1)+1)^{th}$ row to the $5i^{th}$ row are equal to zero. Specifically, if the two feature points of the feature point pair corresponding to the $i^{th}$ constraint are respectively at the sampling points S1 and S2 (i.e., same sampling points as in Equations (3) and (4)), the sampling points S1 and S2 form a sampling interval therebetween. In FIG. 6, among N sampling points, the coefficients for the S1$^{th}$ sampling point to the S2$^{th}$ sampling point are not equal to zero, where $w_1$ corresponds to the sampling point S1 and $w_2$ corresponds to the sampling point S2. Moreover, $w_1$ and $w_2$ are real numbers between 0 and 1. For instance, if there are six sampling points between the two images, an images has five hundreds and sixty row locations, and the sampling point S1 corresponds to forty row locations (i.e., between the 0$^{th}$ row location and the 80$^{th}$ row location), then $w_1$ is 0.5.

After the matrix A is established, the processor 210 is capable of calculating the variables x according to Equation (5). Since the calculated variables x shall have a smooth variation in time, the cost function represented by Equation (5) can further include a result of multiplying the variables x and a differential matrix in another embodiment. For instance, the processor 210 can apply the following Equation (9) to serve as the cost function for the optimization algorithm.

$$\frac{1}{2}\|A_D A_I x - b\|^2 + \frac{1}{2}\lambda\|Gx\|^2 \qquad (9)$$

G is the differential matrix, in which the value of the j$^{th}$ column and the j$^{th}$ row is $-1$ and the value of the j$^{th}$ row and the j+1$^{th}$ column is 1 (i.e., G(j,j)=$-1$ and G(j,j+1)=1), where j is a positive integer, and λ is a real number which can be determined by the user.

After the variables x (i.e., the moving velocities and the angular velocities on all the sampling points) are calculated according to Equation (9), the processor 210 varies locations of the pixels in one of the images according to the moving velocities and the angular velocities corresponding to the variables, so as to generate a first corrected image. Taking the image 310 as an example, it is assumed that the location of a first pixel before correcting is at ($x_{rs}$, $y_{rs}$), and the location thereof after being corrected is ($x_{gs}$, $y_{gs}$)=($x_{rs}$, $y_{rs}$)+($p_x$,$p_y$), in which $p_x$ is the translation of the first pixel in the x-direction, and $p_y$ is the translation of the first pixel in the y-direction. The processor 210 calculates the translations $p_x$ and $p_y$ according to the focal length, the moving velocity and the angular velocity of the image capturing unit 230. For instance, the processor 210 is capable of obtaining the translations $p_x$ and $p_y$ according to the following Equation (10), in which $p_x$ and $p_y$ are real numbers.

$$p_x = \int_{(n+ay_{rs})S}^{(n+0.5)S} \frac{f}{Z}v_x(t) + \frac{1}{f}x_{rs}y_{rs}w_x(t) - \left(f + \frac{x_{rs}^2}{f}\right)w_y(t) + y_{rs}w_z(t)dt \qquad (10)$$

$$p_y = \int_{(n+ay_{rs})S}^{(n+0.5)S} \frac{f}{Z}v_y(t) - \frac{1}{f}x_{rs}y_{rs}w_y(t) + \left(f + \frac{y_{rs}^2}{f}\right)w_x(t) - x_{rs}w_z(t)dt \qquad (11)$$

It should be noted that, all the pixels are moved to the locations corresponding to the exposure time that is (n+0.5)S via Equations (10) and (11). By this way, all the pixels in an image are moved to the locations with the same exposure time, so that the rolling shutter effect can be removed. Here, the image after being calculated through Equations (10) and (11) can also be referred as the first corrected image.

In an embodiment, the processor 210 further stabilizes the first corrected image according to the calculated moving velocities and angular velocities. Specifically, the processor 210 generates a capturing trajectory according to the moving velocity and the angular velocity. The capturing trajectory represents a moving trajectory caused by the user moving the image capturing unit 230. For instance, the processor 210 calculates the capturing trajectory $\vec{p_0^{t_u}}(n)$ according to the following Equation (12), in which n is a real number representing time.

$$\vec{p_0^{t_u}}(n) = \sum_{i=1}^{S_n} v_u(i) \qquad (12)$$

$v_u(i)$ represents the moving velocity or the angular velocity of the image capturing unit 230 at the sampling point i, and u is a symbol indicating the angular velocity or the moving velocity. For instance, if u=x, $v_x$ represents the moving velocity of the image capturing unit 230 in the x-direction. If the variation of the capturing trajectory is tremendously great in time, the video that is playing can have the phenomenon of jitter. Thus, the processor 210 executes a filter calculation for the capturing trajectory, and sets a smooth capturing trajectory as a second variable. The processor 210 generates a cost function according to a difference (or can also be referred as a second difference) between the second variable and the capturing trajectory after executing the filter calculation, and executes a second optimization algorithm for the cost function so as to obtain the smooth capturing trajectory. For instance, the cost function can be represented by the following Equation (13).

$$\min_{\vec{p^{t_u}}} \left\| h \otimes \vec{p_0^{t_u}} - \vec{p^{t_u}} \right\| + \lambda_1 \left\| \nabla \vec{p^{t_u}} \right\| + \lambda_2 \left\| \nabla^2 \vec{p^{t_u}} \right\|^2 \qquad (13)$$

h is a filter such as a Gaussian filter, $\lambda_1$ and $\lambda_2$ are real numbers, $\nabla$ is a gradient vector, $\nabla^2$ is a Laplace operator and $\vec{p^{t_u}}$ is the smooth capturing trajectory. It should be noted that, the smooth capturing trajectory is a vector which indicates the moving velocity or the angular velocity at each of the sampling points, in which the n$^{th}$ element in the smooth capturing trajectory can be represented as $\vec{p^{t_u}}(n)$.

After the smooth capturing trajectory $\vec{p^{t_u}}(n)$ is calculated, the processor 210 varies the locations of the pixels in the first corrected image according to a difference between the smooth capturing trajectory $\vec{p^{t_u}}(n)$ and the capturing trajectory $\vec{p_0^{t_u}}(n)$, so as to generate a second corrected image. Here, it is assumed that the pixels of the first corrected image can be represented as $I_{gs}(x, y)$, and the pixels of the second corrected image can be represented as $I_{ss}(x', y')$. The difference between the smooth capturing trajectory $\vec{p^{t_u}}(n)$ and the capturing trajectory $\vec{p_0^{t_u}}(n)$ can be represented by the following Equation (14); the relationship between the locations of the pixels in the first corrected image and the locations of the pixels in the second corrected image can be represented by the following Equation (15); and the processor 210 generates the second corrected image according to the following Equation (16) and Equation (17). It should be noted that, when u represents the moving velocity and the angular velocity, $\Delta t_u(n)$ can also be re-written as $\Delta t_x(n)$, $\Delta t_y(n)$, $\Delta r_x(n)$, $\Delta r_y(n)$ and $\Delta r_z(n)$.

$$\overrightarrow{p_d^{t_u}}(n) = \overrightarrow{p^{t_x}}(n) - \overrightarrow{p_0^{t_u}}(n) = \Delta t_u(n) \tag{14}$$

$$(x', y') = (x, y) + (p_{x,stab}, p_{y,stab}) \tag{15}$$

$$p_{x,stabilize} = \frac{f}{Z}\Delta t_x(n) + \frac{1}{f}xy\Delta r_x(n) - \left(f + \frac{x^2}{f}\right)\Delta r_y(n) + y\Delta r_z(n) \tag{16}$$

$$p_{y,stabilize} = \frac{f}{Z}\Delta t_y(n) + \frac{1}{f}xy\Delta r_y(n) - \left(f + \frac{x^2}{f}\right)\Delta r_x(n) + x\Delta r_z(n) \tag{17}$$

Figure 7:
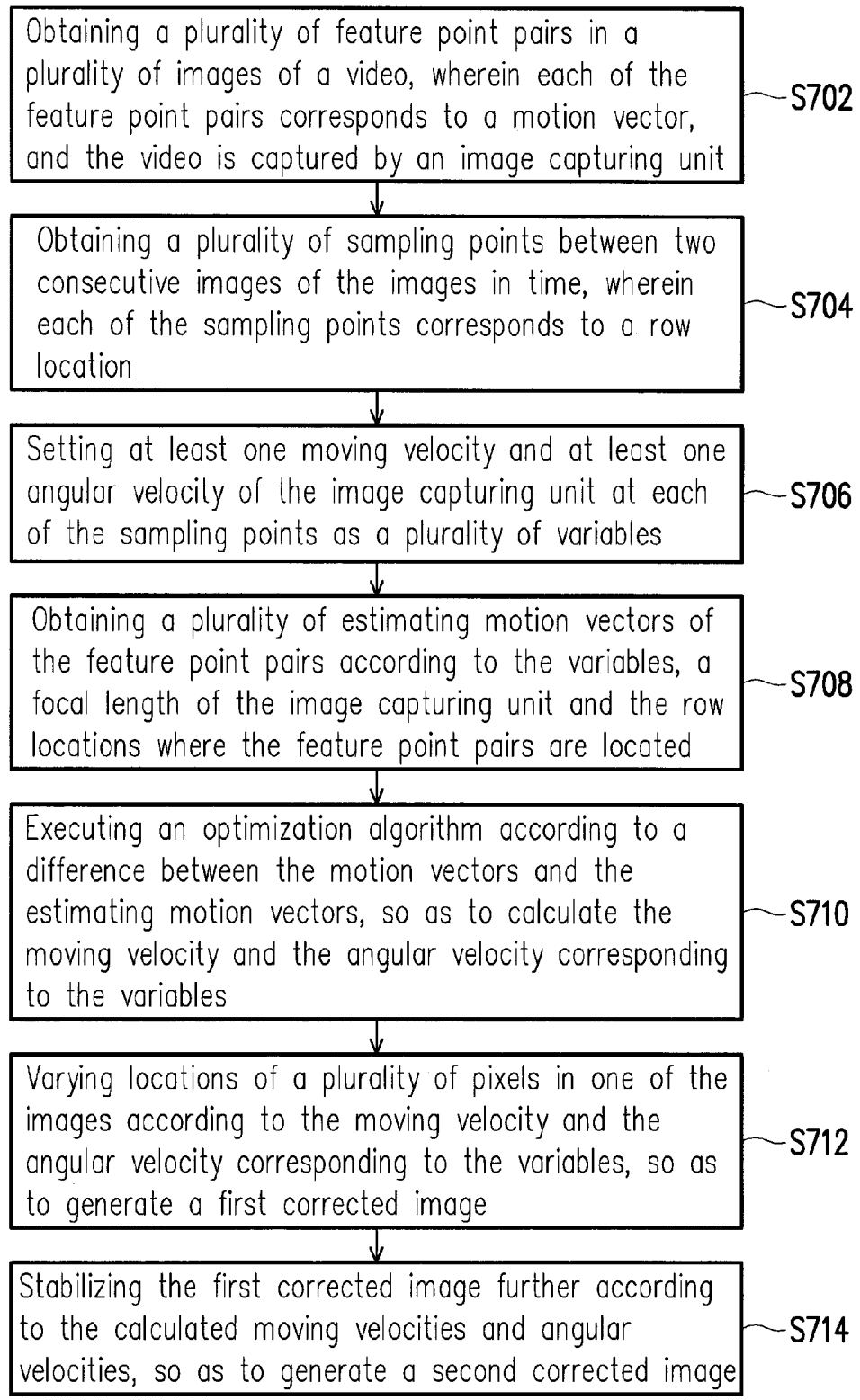
FIG. 7 is a flowchart diagram illustrating a method for correcting a rolling shutter effect according to an embodiment of the invention.

FIG. 7 is a flowchart diagram illustrating a method for correcting a rolling shutter effect according to an embodiment of the invention.

Referring to FIG. 7, in step S702, a plurality of feature point pairs in a plurality of images of a video are obtained, in which each of the feature point pairs corresponds to a motion vector, and the video is captured by an image capturing unit. In step S704, a plurality of sampling points are obtained between two consecutive images of the images in time, in which each of the sampling points corresponds to a row location. In step S706, at least one moving velocity and at least one angular velocity of the image capturing unit at each of the sampling points are set as a plurality of variables. In step S708, a plurality of estimating motion vectors of the feature point pairs are obtained according to the variables, a focal length of the image capturing unit and the row locations where the feature point pairs are located. In step S710, an optimization algorithm is executed according to a difference between the motion vectors and the estimating motion vectors, so as to calculate the moving velocity and the angular velocity corresponding to the variables. In step S712, locations of a plurality of pixels in one of the images are varied according to the moving velocity and the angular velocity corresponding to the variables, so as to generate a first corrected image. In step S714, the first corrected image is further stabilized according to the calculated moving velocities and angular velocities, so as to generate a second corrected image. However, the detailed descriptions for each of the steps depicted in FIG. 7 have already been illustrated above, and so further elaboration is omitted. It should be noted that, step S714 is an optional step, namely, step S714 can be omitted in an embodiment.

In an embodiment, each of the steps executed by the processor 210 can be implemented by one or a plurality of circuits, although the invention is not limited to be implemented through software or hardware.

In view of the foregoing, in the embodiments of the invention, the method for correcting the rolling shutter effect and the image processing device using the same are capable of obtaining sampling points with high temporal resolution and calculating the moving velocity and the angular velocity at each of the sampling points through the optimization algorithm. By using the moving velocities and the angular velocities, the rolling shutter effect can be corrected and the video can be more stabilized.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for correcting a rolling shutter effect on an image processing device, comprising:
    obtaining a plurality of feature point pairs in a plurality of images of a video, wherein each of the feature point pairs corresponds to a motion vector, and the video is captured by an image capturing unit;
    obtaining a plurality of sampling points between two consecutive images of the images in time, wherein each of the sampling points corresponds to a row location;
    setting at least one moving velocity and at least one angular velocity of the image capturing unit at each of the sampling points as a plurality of variables;
    obtaining a plurality of estimating motion vectors of the feature point pairs according to the variables, a focal length of the image capturing unit and the row locations where the feature point pairs are located;
    executing an optimization algorithm according to a difference between the motion vectors and the estimating motion vectors, so as to calculate the at least one moving velocity and the at least one angular velocity corresponding to the variables; and
    varying locations of a plurality of pixels in one of the images according to the at least one moving velocity and the at least one angular velocity corresponding to the variables, so as to generate a first corrected image.

2. The method for correcting the rolling shutter effect according to claim 1, wherein the feature point pairs comprise a second feature point pair, and the second feature point pair comprises a second feature point and a third feature point, where a location of the second feature point is $(x_1, y_1)$, a location of the third feature point is $(x_2, y_2)$ and the motion vector corresponding to the second feature point pair is $(x_2-x_1, y_2-y_1)$, wherein the step of obtaining the estimating motion vectors of the feature point pairs according to the variables, the focal length of the image capturing unit and the row locations where the feature point pairs are located comprises:
    calculating an x-component of the estimating motion vector corresponding to the second feature point pair according to the following Equation (1), and calculating a y-component of the estimating motion vector corresponding to the second feature point pair according to the following Equation (2):

$$\sum_{i=S1}^{S2} \frac{f}{Z}\overline{v_x}(i) + \frac{x_1 y_1}{f}\overline{w_x}(i) - \left(f + \frac{x_1^2}{f}\right)\overline{w_y}(i) + y_1\overline{w_z}(i) \tag{1}$$

$$\sum_{i=S1}^{S2} \frac{f}{Z}\overline{v_y}(i) + \frac{x_1 y_1}{f}\overline{w_y}(i) - \left(f + \frac{y_1^2}{f}\right)\overline{w_x}(i) + x_1\overline{w_z}(i) \tag{2}$$

wherein S1 and S2 are real numbers, S1 represents the sampling point corresponding to the row location where the second feature point is located, and S2 represents the sampling point corresponding to the row location where the third feature point is located, f is a focal length of the image capturing unit, Z is a depth of field of the images, $\overline{v_x}(i)$ is the at least one moving velocity of the image capturing unit at a sampling point i in an x-direction, $\overline{v_y}(i)$ is the at least one moving velocity of the i image capturing unit at the sampling point i in a y-direction, $\overline{w_x}(i)$ is the at least one angular velocity of the image capturing unit at the sampling point i on an x-axis, $\overline{w_y}(i)$ is the at least one angular velocity of the image capturing unit at the sampling point i on a y-axis, and $\overline{w_z}(i)$ is the at least one angular velocity of the image capturing unit at the sampling point i on a z-axis.

3. The method for correcting the rolling shutter effect according to claim 1, wherein the step of executing the optimization algorithm according to the difference between the motion vectors and the estimating motion vectors comprises:

generating a plurality of constraints according to x-components and y-components of the motion vectors;

generating a first matrix according to the estimating motion vectors, wherein the number of rows in the first matrix is greater than the number of columns in the first matrix; and generating a cost function according to a result obtained by subtracting the constraints from the product of the first matrix and the variables, and executing the optimization algorithm according to the cost function so as to obtain the at least one moving velocity and the at least one angular velocity corresponding to the variables.

4. The method for correcting the rolling shutter effect according to claim 3, wherein the cost function further comprises a result obtained from the product of the variables and a differential matrix, wherein a value of a $j^{th}$ column and a $j^{th}$ row in the differential matrix is −1, and a value of the $j^{th}$ row and a $j+1^{th}$ column in the differential matrix is 1, where j is a positive integer.

5. The method for correcting the rolling shutter effect according to claim 3, wherein the product of a second matrix and a third matrix is the first matrix, in an $i^{th}$ row of the second matrix, only values from a $5(i-1)+1^{th}$ column to a $5i^{th}$ column are not equal to zero, and an $i^{th}$ column of the second matrix corresponds to an $i^{th}$ constraint of the constraints, where i is a positive integer, and the $i^{th}$ constraint corresponds to a $(5(i-1)+1)^{th}$ row to a $5i^{th}$ row of the third matrix, and values of a sampling interval without corresponding to the $i^{th}$ constraint in the $(5(i-1)+1)^{th}$ row to the $5i^{th}$ row are equal to zero.

6. The method for correcting the rolling shutter effect according to claim 1, wherein the images comprise a second image, a location of a first pixel in the second image is $(x_{rs}, y_{rs})$, wherein the step of varying the locations of the pixels in one of the images according to the at least one moving velocity and the at least one angular velocity corresponding to the variables so as to generate the first corrected image comprises:

calculating a translation $p_x$ of the first pixel in an x-direction according to Equation (3), and calculating a translation $p_y$ of the first pixel in a y-direction according to Equation (4), where $p_x$ and $p_y$ are real numbers, $$p_x = \int_{(n+ay_{rs})S}^{(n+0.5)S} \frac{f}{Z}v_x(t) + \frac{1}{f}x_{rs}y_{rs}w_x(t) - \left(f + \frac{x_{rs}^2}{f}\right)w_y(t) + y_{rs}w_z(t)dt \quad (3)$$

$$p_y = \int_{(n+ay_{rs})S}^{(n+0.5)S} \frac{f}{Z}v_y(t) - \frac{1}{f}x_{rs}y_{rs}w_y(t) + \left(f + \frac{y_{rs}^2}{f}\right)w_x(t) - x_{rs}w_z(t)dt \quad (4)$$

wherein n is a positive integer, the second image begins to expose from a time point nS to a time point (n+1)S, a is a floating point number, f is a focal length of the image capturing unit, Z is a depth of field of the images, $v_x(t)$ is the at least one moving velocity of the image capturing unit at a time point t in the x-direction, $v_y(t)$ is the at least one moving velocity of the image capturing unit at the time point t in the y-direction, $w_x(t)$ is the at least one angular velocity of the image capturing unit at the time point t on an x-axis, $w_y(t)$ is the at least one angular velocity of the image capturing unit at the time point t on a y-axis, and $w_z(t)$ is the at least one angular velocity of the image capturing unit at the time point t on a z-axis.

7. The method for correcting the rolling shutter effect according to claim 1, further comprising:

generating a capturing trajectory according to the at least one moving velocity and the at least one angular velocity;

executing a filter calculation for the capturing trajectory;

setting a smooth capturing trajectory as a second variable, and generating a cost function according to a second difference between the second variable and the capturing trajectory after executing the filter calculation; and executing a second optimization algorithm according to the cost function, so as to obtain the smooth capturing trajectory.

8. The method for correcting the rolling shutter effect according to claim 7, further comprising:

varying the locations of the pixels in the first corrected image according to a difference between the smooth capturing trajectory and the capturing trajectory, so as to generate a second corrected image.

9. An image processing device, comprising:

a memory, storing a plurality of instructions; and a processor, coupled to the memory, configured to execute the instructions to execute a plurality of steps:

obtaining a plurality of feature point pairs in a plurality of images of a video, wherein each of the feature point pairs corresponds to a motion vector, and the video is captured by an image capturing unit;

obtaining a plurality of sampling points between two consecutive images of the images in time, wherein each of the sampling points corresponds to a row location;

setting at least one moving velocity and at least one angular velocity of the image capturing unit at each of the sampling points as a plurality of variables;

obtaining a plurality of estimating motion vectors of the feature point pairs according to the variables, a focal length of the image capturing unit and the row locations where the feature point pairs are located;

executing an optimization algorithm according to a difference between the motion vectors and the estimating motion vectors, so as to calculate the at least one moving velocity and the at least one angular velocity corresponding to the variables; and varying locations of a plurality of pixels in one of the images according to the at least one moving velocity and the at least one angular velocity corresponding to the variables, so as to generate a first corrected image.

10. The image processing device according to claim 9, wherein the feature point pairs comprise a second feature point pair, and the second feature point pair comprises a second feature point and a third feature point, where a location of the second feature point is $(x_1, y_1)$, a location of the third feature point is $(x_2, y_2)$, and the motion vector corresponding to the second feature point pair is $(x_2-x_1, y_2-y_1)$, wherein the step of obtaining the estimating motion vectors of the feature point pairs according to the variables, the focal length of the image capturing unit and the row locations where the feature point pairs are located comprises:

calculating an x-component of the estimating motion vector corresponding to the second feature point pair according to the following Equation (1), and calculating a y-component of the estimating motion vector corresponding to the second feature point pair according to the following Equation (2):

$$\sum_{i=S1}^{S2} \frac{f}{Z}\overline{v_x}(i) + \frac{x_1 y_1}{f}\overline{w_x}(i) - \left(f + \frac{x_1^2}{f}\right)\overline{w_y}(i) + y_1 \overline{w_z}(i) \quad (1)$$

$$\sum_{i=S1}^{S2} \frac{f}{Z}\overline{v_y}(i) + \frac{x_1 y_1}{f}\overline{w_y}(i) - \left(f + \frac{y_1^2}{f}\right)\overline{w_x}(i) + x_1 \overline{w_z}(i) \quad (2)$$

wherein S1 and S2 are real numbers, S1 represents the sampling point corresponding to the row location where the second feature point is located, and S2 represents the sampling point corresponding to the row location where the third feature point is located, f is a focal length of the image capturing unit, Z is a depth of field of the images, $\overline{v_x}(i)$ is the at least one moving velocity of the image capturing unit at a sampling point i in an x-direction, $\overline{v_y}(i)$ is the at least one moving velocity of the i image capturing unit at the sampling point i in a y-direction, $\overline{w_x}(i)$ is the at least one angular velocity of the image capturing unit at the sampling point i on an x-axis, $\overline{w_y}(i)$ is the at least one angular velocity of the image capturing unit at the sampling point i on a y-axis, and $\overline{w_z}(i)$ is the at least one angular velocity of the image capturing unit at the sampling point i on a z-axis.

11. The image processing device according to claim 9, wherein the step of executing the optimization algorithm according to the difference between the motion vectors and the estimating motion vectors comprises:
generating a plurality of constraints according to x-components and y-components of the motion vectors;
generating a first matrix according to the estimating motion vectors, wherein the number of rows in the first matrix is greater than the number of columns in the first matrix; and
generating a cost function according to a result obtained by subtracting the constraints from the product of the first matrix and the variables, and executing the optimization algorithm according to the cost function so as to obtain the at least one moving velocity and the at least one angular velocity corresponding to the variables.

12. The image processing device according to claim 11, wherein the cost function further comprises a result obtained from the product of the variables and a differential matrix, wherein a value of a $j^{th}$ column and a $j^{th}$ row in the differential matrix is −1, and a value of the $j^{th}$ row and a $j+1^{th}$ column in the differential matrix is 1, where j is a positive integer.

13. The image processing device according to claim 11, wherein the product of a second matrix and a third matrix is the first matrix,
in an $i^{th}$ row of the second matrix, only values from a $5(i-1)+1^{th}$ column to a $5i^{th}$ column are not equal to zero, and an $i^{th}$ column of the second matrix corresponds to an $i^{th}$ constraint of the constraints, where i is a positive integer, and
the $i^{th}$ constraint corresponds to a $(5(i-1)+1)^{th}$ row to a $5i^{th}$ row of the third matrix, and values of a sampling interval without corresponding to the $i^{th}$ constraint in the $(5(i-1)+1)^{th}$ row to the $5i^{th}$ row are equal to zero.

14. The image processing device according to claim 9, wherein the images comprise a second image, a location of a first pixel in the second image is $(x_{rs}, y_{rs})$, wherein the step of varying the locations of the pixels in one of the images according to the at least one moving velocity and the at least one angular velocity corresponding to the variables so as to generate the first corrected image comprises:
calculating a translation $p_x$ of the first pixel in an x-direction according to Equation (3), and calculating a translation $p_y$ of the first pixel in a y-direction according to Equation (4), wherein $p_x$ and $p_y$ are real numbers, $$p_x = \int_{(n+a y_{rs})S}^{(n+0.5)S} \frac{f}{Z}v_x(t) + \frac{1}{f}x_{rs}y_{rs}w_x(t) - \left(f + \frac{x_{rs}^2}{f}\right)w_y(t) + y_{rs}w_z(t)dt \quad (3)$$

$$p_y = \int_{(n+a y_{rs})S}^{(n+0.5)S} \frac{f}{Z}v_y(t) - \frac{1}{f}x_{rs}y_{rs}w_y(t) + \left(f + \frac{y_{rs}^2}{f}\right)w_x(t) - x_{rs}w_z(t)dt \quad (4)$$

wherein n is a positive integer, the second image begins to expose from a time point nS to a time point (n+1)S, a is a floating point number, f is a focal length of the image capturing unit, Z is a depth of field of the images, $v_x(t)$ is the at least one moving velocity of the image capturing unit at a time point t in the x-direction, $v_y(t)$ is the at least one moving velocity of the image capturing unit at the time point t in the y-direction, $w_x(t)$ is the at least one angular velocity of the image capturing unit at the time point t on an x-axis, $w_y(t)$ is the at least one angular velocity of the image capturing unit at the time point t on a y-axis, and $w_z(t)$ is the at least one angular velocity of the image capturing unit at the time point t on a z-axis.

15. The image processing device according to claim 9, wherein the steps further comprise:
generating a capturing trajectory according to the at least one moving velocity and the at least one angular velocity;
executing a filter calculation for the capturing trajectory;
setting a smooth capturing trajectory as a second variable, and generating a cost function according to a second difference between the second variable and the capturing trajectory after executing the filter calculation; and
executing a second optimization algorithm according to the cost function, so as to obtain the smooth capturing trajectory.

16. The image processing device according to claim 15, wherein the steps further comprise:
varying the locations of the pixels in the first corrected image according to a difference between the smooth capturing trajectory and the capturing trajectory, so as to generate a second corrected image.

* * * * *